United States Patent [19]

Hirao

[11] 3,936,060
[45] Feb. 3, 1976

[54] MEANS FOR DETECTING OPENING DEGREE OF CLAWS OF AN ELECTRICALLY DRIVEN MACHINE TOOL CHUCK

[75] Inventor: Kenichi Hirao, Kawasaki, Japan
[73] Assignee: Fuji Electric Company, Ltd., Kawasaki, Japan
[22] Filed: Aug. 7, 1974
[21] Appl. No.: 495,468

[30] Foreign Application Priority Data
Aug. 8, 1973  Japan............................ 48-93331[U]

[52] U.S. Cl................. 279/1 H; 279/1 R; 279/110; 318/603
[51] Int. Cl.².......................................... B23B 31/02
[58] Field of Search.................... 279/1 H, 1 R, 110; 318/603, 572

[56] References Cited
UNITED STATES PATENTS
2,006,621  7/1935  Berg................................... 279/1 H
3,218,532  11/1965  Toscano.............................. 318/572
3,673,393  6/1972  Schober.............................. 318/603

Primary Examiner—J. M. Meister
Attorney, Agent, or Firm—Sughrue, Rothwell, Mion, Zinn & Macpeak

[57] ABSTRACT

A means for detecting the degree of opening of claws of an electrically driven chuck in which the jaws are driven by an electric motor, is disclosed which includes a first detecting station having a cam plate secured to the shaft of the motor and a plurality of switch means adapted for detecting the revolutions of the cam plate, a second detecting station including another a second cam plate fixed to a main power shaft of a machine tool in which said chuck is incorporated and another plurality of switch means adapted for detecting the revolutions of the another second cam plate, and a present counter adapted for emitting a signal representing the actual opening degree upon comparing two input signals delivered from the respective detecting stations.

5 Claims, 2 Drawing Figures

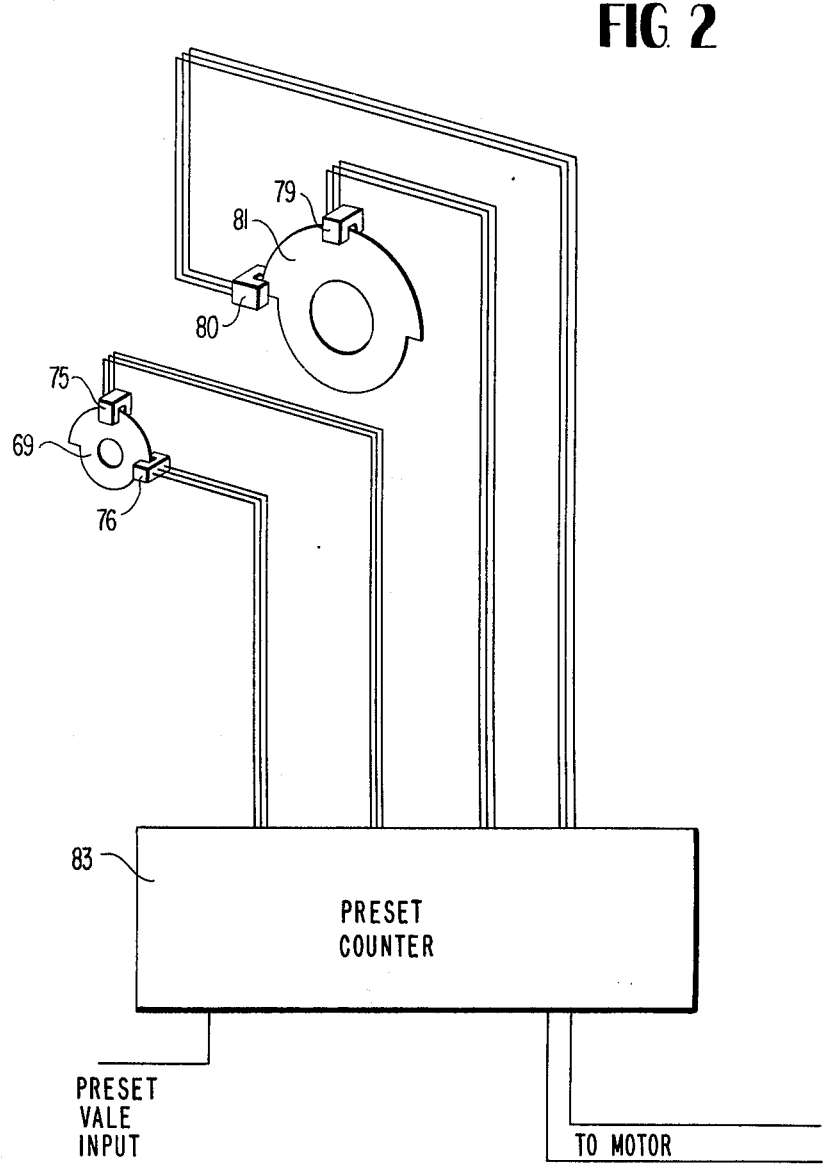

MEANS FOR DETECTING OPENING DEGREE OF CLAWS OF AN ELECTRICALLY DRIVEN MACHINE TOOL CHUCK

BACKGROUND OF THE INVENTION

The present invention relates to numerically controlled machine tools, and more particularly to a means for detecting the degree of opening of the jaws of an electrically driven chuck on a numerically controlled machine tool.

In recent years, remarkable progress has been made in the automation of machine tools, especially in the field of numerically controlled machine tools which are controlled in accordance with programs in tapes or other input mediums.

This progress given rise to a requirement to adapt a numerically controlled machine tool for the production of different shapes and sizes, each article being few in quantity.

SUMMARY OF THE INVENTION

The present invention provides a means for detecting the degree of opening of the jaws of an electrically driven chuck.

It is an object of the present invention to provide an electrically driven chuck which is capable of being incorporated in the control system in such a manner that a desired opening is preset numerically in accordance with diameter of the workpiece to be held in the chuck, a signal is delivered to a driving unit for opening or closing the chuck, while another signal is transmitted from the detector which represents the actual degree of opening to be compared with the preset value in the control system, so that the signal to the chuck driving unit is stopped when the desired opening is detected by the detector.

The present invention is based on the use of a chuck in which there exists a constant ratio between the distance traveled by the jaws, and the difference between the revolutions of a chuck driving torque shaft and a main power shaft of the machine tool. It is to be appreciated that, owing to this feature, the position of the jaws can be detected by counting the respective revolutions of these two shafts.

Due to above features, the present invention provides good reproducibility of the position which is essential for the automatic control, and at the same time, enable the chuck to be interlocked or to cooperate with associated automatically operated parts by utilizing the signal representing the actual degree of an opening of the claws.

BRIEF DESCRIPTION OF THE DRAWING

FIG. 2 is a schematic block diagram showing the arrangement of the detecting means of the present invention.

DETAILED DESCRIPTION OF PREFERRED EMBODIMENT

Figure 1:
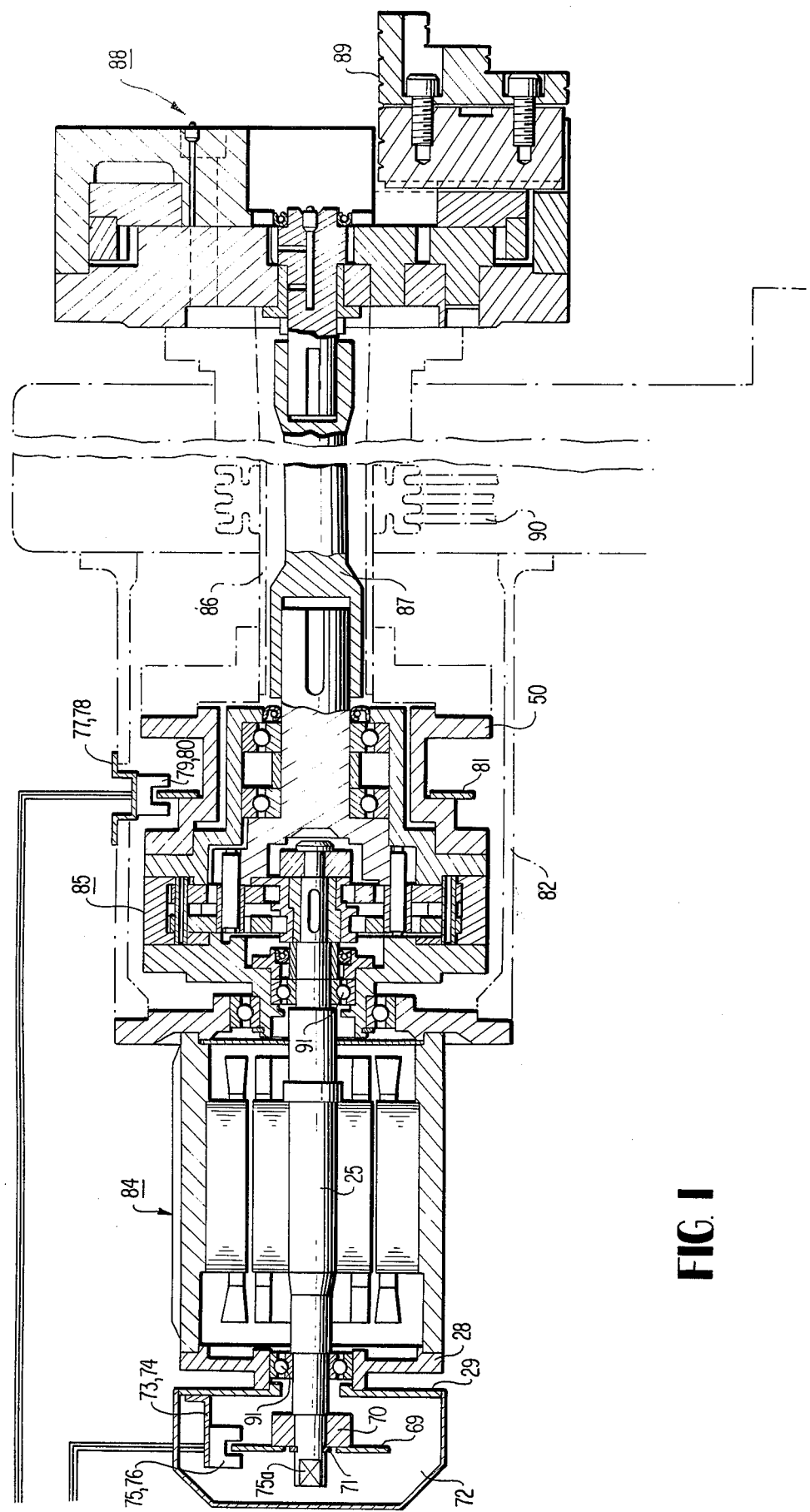
FIG. 1 is a longitudinal sectional view of a portion of a machine tool for operating a chuck incorporating a detecting means of the present invention.

Generally, an electrically driven machine tool has the structure wherein a motor shaft 25 is supported by shaft bearings 91 of a driving motor 84. A chuck 88 is connected to driving motor 84 by torque shaft 86 and speed reduction device 85. The chuck 88 is of the type wherein the radial position of the jaws 89 can be varied by rotating the torque shaft 86. A typical chuck is shown in U.S. Pat. No. 3,499,657. The chuck 88 is also connected to main shaft 86 which is rotated by V-belts 90 by another power source (not shown). The rotation of main shaft 86 causes the entire chuck assembly 88 to rotate.

As will be explained hereinafter, the present invention is to detect the degree of opening of claws by detecting the relative rotation between the main shaft, i.e., the location of the outer frame system of the chuck device 88, and the motor shaft 25, i.e., the location of the claw 89 of chuck device, in the electrically driven chuck.

Referring to FIG. 1, the sleeve 70 is mounted on a motor shaft 25, and is secured thereto by means of stop ring 71 which is adapted to prevent any axial movement of the sleeve with respect to the shaft.

This sleeve 70, and a cam plate 69 are fixed to the motor shaft 25 concentrically and for rotary motion therewith.

A carrier plate 29 is fixed to a shield 28 attached to motor 84, which is near to the shaft bearing, while the carrier plate 29, in turn, carries a first access switch support plate 73 and a second access switch support plate 74. These two support plates are arranged in such a manner that there is a phase difference angle of 90° therebetween.

A first access switch 75 and a second access switch 76 are carried by the first support plate 73 and the second support plate 74, respectively, and are so positioned as to be able to generate signals representing the revolution of the shaft 25 as the cam plate 69 rotates to close the switches 75, 76. Switches 75,76 and the cam plate 69 form a first detecting station. Another cam plate 81 is mounted on a flange 50 cencentrically with the latter. The flange 50 is rigidly connected to the main shaft 86 of the machine tool.

A third access switch 79 and a fourth access switch 80 are secured to an adapter 82 of the chuck driving motor, through respective support plates 77 and 78, so as to form therebetween a phase differencial angle of 270° measured in the direction of rotaion of the main shaft 86. The adapter 82 is secured to the body of the machine tool. The third and the fourth switch, in combination with the cam plate 81, constitute a second detecting station. The first and second detecting stations are electrically connected to a preset counter 83, as shown in FIG. 2, which is capable of discriminating the direction of the rotation of each shaft and of calculating the difference between the revolutions of the shafts, upon receipt of signals from the first and the second detecting stations.

The means for detecting the opening degree of the jaws as explained above can be used in combination with an electrically drived chuck in which the radial adjustment of the chuck jaws is directly proportional to the difference of the revolutions between the motor shaft 25 and the main shaft 86 of the machine tool.

In such an electrically driven chuck, the construction is such that the motor shaft 25 and the main shaft 86 rotate at the same speed when the main shaft 86 is driven. Therefore, there is no differential revolutions between the cam plate 69 and the cam plate 81 when the main shaft of the machine tool is rotating, and accordingly, there is no radial travel of the jaws in the chuck.

However, when it is required to change the opening degree of the jaws, the main shaft 86 is stopped and the motor for driving the chuck is energized upon receipt of a signal from a control system, so that the cam plate 69 is rotated independently of the cam plate 81, in one direction or the other, depending on whether the opening of the jaws is to be increased or to be decreased.

As the cam plate 69 rotates to close the first and the second access switches 75 and 76, these switches deliver signals to the present counter 83 which then discriminates the direction of rotation of the cam plate 69 and counts the revolutions of the cam plate 69. It will be understood that the counted revolutions and the direction of rotation of the cam plate 69 and, also that of the motor shaft, exactly represents the opening degree of the jaws because the opening degree is directly proportional to the difference between the counted revolutions of the motor shaft 25 and the counted revolutions of the main shaft 86, and because the difference is equal to the counted revolutions of the motor shaft when the main shaft is kept stationary.

The present counter 83 then compares the delivered signals representing the actual position with a preset signal which corresponds to the desired opening degree, and delivers a signal to go on with the energization of the motor until the value of the detected signal is the same as by the present value, i.e., until the jaws are opened or closed to the desired position.

At the time when the preset value is reached by the detected value, the output from the preset counter goes to zero and the motor 84 is de-energized to hold the jaws at that position.

It is to be noted that the detection of the position of the jaws can be detected, even when the main shaft 25 is merely rotating due to its inertia, since the output from the preset counter corresponds to the difference of the revolutions between the cam plate 69 and the cam plate 81, as accurately as is the case where the main shaft is stopped.

What is claimed is:

1. In a machine tool having a chuck with radially adjustable jaws, a main shaft connected to said chuck to rotate same, a torque shaft connected to said chuck so as to adjust the radial position of said jaws, a motor having an output shaft and operatively connected to said torque shaft to cause same to rotate with respect to said chuck to cause the movement of said jaws so as to adjust the clamping diameter of the jaws, the improved means for detecting the degree of opening of said jaws comprising:
   a. a first detecting means operated by said motor output shaft for detecting the number of revolutions and direction of rotation of said motor output shaft;
   b. a second detecting means operated by said main shaft for detecting the number of revolutions and direction of rotation of said main shaft;
   c. counting means connected to said first and second detecting means to compare the difference between the number of revolutions of said motor output shaft and said main shaft, with a preset value and generate an output signal when said difference is not equal to said preset value; and
   d. means connecting said counting means output signal to said motor such that said motor adjusts said chuck jaws whenever said counting means generates an output signal.

2. The improved detecting means of claim 1 wherein said first detecting means comprises:
   a. a cam plate attached to said motor output shaft so as to rotate therewith:
   b. a plurality of electrical switch means disposed circumferentially about said motor output shaft such that rotation of said cam plate causes said switch means to sequentially open and close; and
   c. means electrically connecting said switch means to said counting means.

3. The improved detecting means of claim 2 wherein two switch means are disposed circumferentially about said motor output shaft, said switch means being located 90° apart.

4. The improved detecting means of claim 1 wherein said second detecting means comprises:
   a. a cam plate attached to said main shaft so as to rotate therewith;
   b. a plurality of electrical switch means disposed circumferentially about said main shaft such that rotation of said cam plate causes said switch means to sequentially open and close; and
   c. means electrically connecting said switch means to said counting means.

5. The improved detecting means of claim 4 wherein two switch means are disposed circumferentially about said main shaft, said switch means disposed 270° from each other measured in the direction of rotation of said main shaft.

* * * * *